US006001749A

United States Patent [19]
Child et al.

[11] Patent Number: 6,001,749
[45] Date of Patent: Dec. 14, 1999

[54] PATTERNED CONDUCTIVE TEXTILES

[75] Inventors: Andrew D. Child; Alfred R. DeAngelis, both of Spartanburg, S.C.

[73] Assignee: Milliken & Company, Spartanburg, S.C.

[21] Appl. No.: 08/903,079

[22] Filed: Jul. 30, 1997

[51] Int. Cl.[6] .............................. B05D 5/12; B05D 1/32; B32B 27/12

[52] U.S. Cl. ........................ 442/71; 442/110; 442/115; 442/81; 442/82; 428/195; 428/196; 427/259; 427/288; 427/407.1

[58] Field of Search ............................. 442/110, 71, 115, 442/79, 82, 84, 81; 428/195; 427/256, 261, 288, 259, 407.1, 412

[56] References Cited

U.S. PATENT DOCUMENTS

| | | | |
|---|---|---|---|
| 4,803,096 | 2/1989 | Kuhn et al. | 427/121 |
| 4,923,743 | 5/1990 | Stewart, Jr. | 427/288 |
| 4,975,317 | 12/1990 | Kuhn et al. | 428/253 |
| 5,102,727 | 4/1992 | Pittman et al. | 428/259 |
| 5,162,135 | 11/1992 | Gregory et al. | 427/121 |
| 5,292,573 | 3/1994 | Adams, Jr. et al. | 428/196 |
| 5,624,736 | 4/1997 | DeAngelis et al. | 428/196 |

OTHER PUBLICATIONS

M.L. Joseph, "Indroductory Textile Science," Fifth Ed., Chapter 29, pp. 338–350, 1986.

*Primary Examiner*—Terrel Morris
*Assistant Examiner*—Cheryl Juska
*Attorney, Agent, or Firm*—Terry T. Moyer; Timothy J. Monahan

[57] ABSTRACT

A patterned conductive textile is provided by applying a finish to selected parts of a fabric which inhibits the formation of a conductive polymer coating on those areas. A conductive polymer is then oxidatively synthesized onto the remaining areas from an aqueous solution comprising the starting monomer, an oxidizing agent, and, optionally, a doping agent or counterion. The areas with the inhibitor finish remain substantially free of conductive polymer and a pattern of conductive and nonconductive areas is thus produced.

21 Claims, 2 Drawing Sheets

PATTERNED CONDUCTIVE TEXTILES

BACKGROUND OF THE INVENTION

1. Field of the Invention

This invention relates generally to a method of coating a conductive polymer on a substrate and to materials produced thereby. In particular, the present invention relates to a method of coating a conductive polymer on selected areas of a substrate in a controlled pattern by first inhibiting the formation of the coating on certain areas of the substrate and then applying a conductive polymer coating to the non-inhibited areas.

2. Description of the Prior Art

The impartation of increased electrical conductivity to substrates such as textile fabrics is well known. Textiles, such as fibers, yarns, and fabric, having a conductive polymer coating, are disclosed by Kuhn, et al. in U.S. Pat. No. 4,803,096. These textiles, while finding application in the control of static electricity, attenuation of electromagnetic energy, and resistance heating, are generally isotropic, which may impose limitations on their use.

Methods have been suggested to increase the electrical conductivity of only a portion of a substrate. For instance, Pittman, et al., U.S. Pat. No. 5,102,727 discloses textiles having a conductivity gradient produced by blending conductive and non-conductive yarns. Likewise Gregory et al., U.S. Pat. No. 5,162,135 teaches a conductive gradient achieved by contacting a conductive textile with a chemical reducing agent. These two methods are believed to be acceptable for producing conductivity gradients in simple patterns but difficult to apply in the production of more complex patterns.

Other methods have been disclosed in which an entire substrate is coated with a conductive polymer and then selected portions of the conductive polymer are removed. Adams, Jr. et al., U.S. Pat. No. 5,292,573 for instance teaches a method in which a textile fabric coated with a conductive polymer is subjected to a water jet process which removes a portion of the coating from selected areas of the substrate. Since only a portion of the coating is removed by the water jet, the difference in conductivity between different areas that can be achieved may be limited. Further, the process is inherently limited by the expense and sophistication of the water jet equipment required to practice it.

DeAngelis et al., U.S. Pat. No. 5,624,736, teaches a method in which selected areas of a substrate, already having been coated with a conductive polymer across its whole surface, are further coated with a protective film. The substrate is then subjected to a third treatment in which a chemical etching agent is used to remove the conductive polymer from the exposed portions of the substrate which were not coated with the protective film. Finally the substrate is rinsed to remove excess etching agent. Such a process, with so many operational steps, is rather complicated and lengthy and, like any process which involves coating an entire substrate only to remove large portions of the coating, necessarily involves a good deal of material loss.

For these reasons, there still exists a need for a simpler, quicker, and less wasteful method of coating substrates with conductive polymers in which only selected areas are coated in the first instance and which is readily adaptable to producing complex patterns of varying conductivity on large substrates.

SUMMARY OF THE INVENTION

It is thus an object of the present invention to provide a substrate with areas of unequal electrical conductivity produced without having to first coat the entire substrate with a conductive polymer and then selectively remove portions of the conductive polymer. It is another object of the present invention to provide a method of inhibiting the deposition of conductive polymer coating on selected areas of a substrate. Another object of the invention is to provide a substrate having areas of low electrical conductivity in controlled patterns which can vary in size and shape. Still another object of the invention is to provide a method of producing a substrate with patterned conductivity which can be readily adapted to large-scale manufacturing so as to produce complex patterns by applying inhibitor to a moving substrate and which produces a smaller wastestream. Yet another object of the invention is produce a substrate material which can defeat military imaging radar.

Accordingly, a substrate material having patterned conductivity is provided by applying a durable finish to portions of the chosen substrate which will inhibit or prevent a coating of conductive polymer from forming on those areas of the substrate. The substrate, now partially finished with this inhibitor, is then contacted with a water-based solution containing an oxidatively polymerizable compound, an oxidizing agent capable of causing the aforementioned compound to polymerize, and a doping agent. The substrate is thereby coated with a conductive polymer in all areas in which the inhibitor had not been previously applied while the areas in which the inhibitor was applied remain substantially free of any conductive polymer coating.

Besides meeting the above objectives, the present invention, in its preferred embodiments, contains one or more of the following features:

- the substrate is a textile fabric which is either woven, non-woven, or knitted;
- the substrate material is selected from glass fibers, polyamide, or polyester, preferentially polyester fibers;
- the conductive polymer is polypyrrole or a similar polymer of a substituted pyrrole;
- the inhibitor is either a fluorocarbon or a silicone and is preferentially a fluorocarbon;
- the inhibitor pattern can by applied by screen printing or by controlled spray patterning, preferentially by controlled spray patterning; and
- the method uses less of the conductive polymer than previous methods and generates less conductive polymer waste.

DETAILED DESCRIPTION OF THE INVENTION

Figure 1:
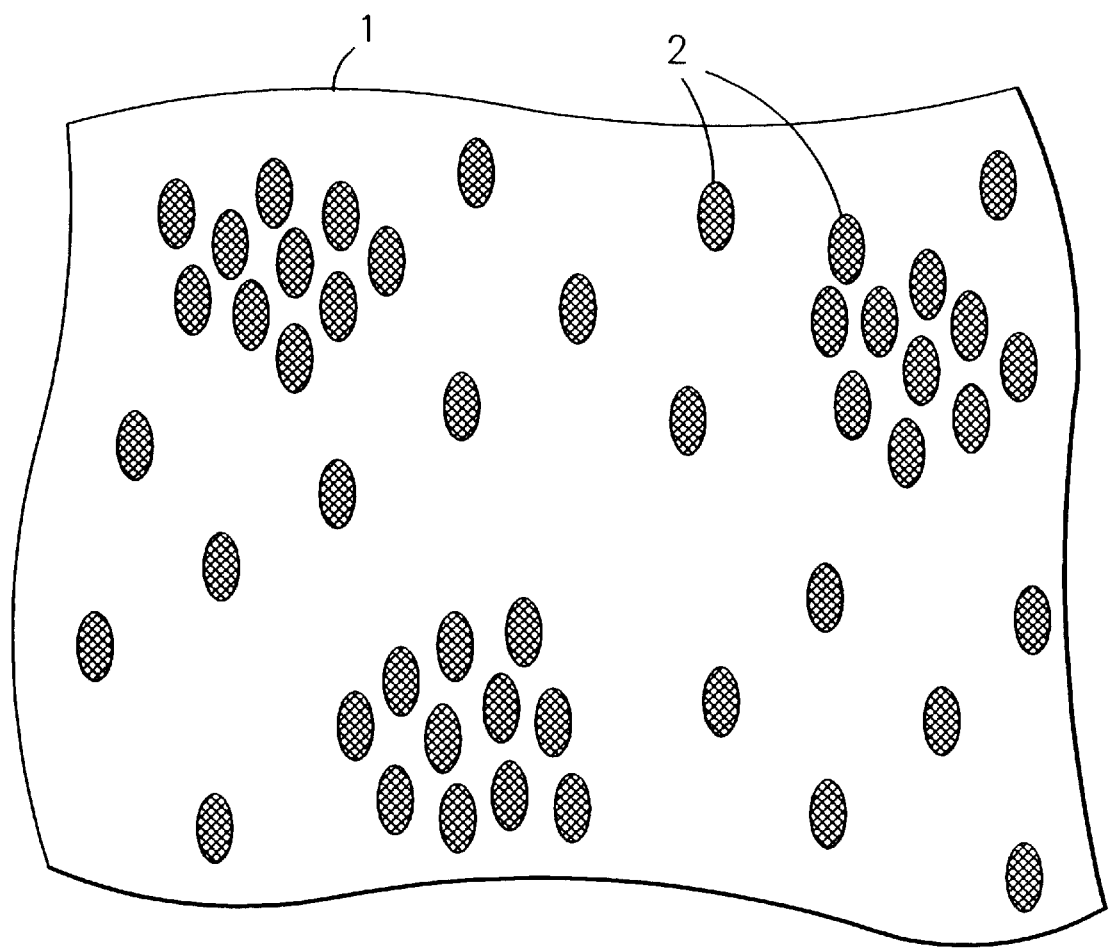
FIG. 1 is a fabric having an inhibiting finish deposited on selected areas (ovals).

Without limiting the scope of the invention, the preferred embodiments and features are hereinafter set forth. Unless otherwise indicated, all parts and percentages are by weight and conditions are ambient, i.e. one atmosphere of absolute pressure and 25° C. The terms aryl and arylene are intended to be limited to single and fused double ring aromatic hydrocarbons. Unless otherwise specified, aliphatic hydrocarbons are from 1 to 12 carbons atoms in length, and cycloaliphatic hydrocarbons comprise from 3 to 8 carbon atoms.

All of the United States patents cited in this Specification are incorporated by reference.

A process according to the present invention for making patterned conductive substrates comprises the steps of applying a finish to selected areas of a substrate which inhibits the coating of the substrate with conductive polymer and the subsequent coating of the unfinished areas of the substrate with a conductive polymer by oxidative polymerization.

The substrate may be any material in the form of a sheet or film, and is preferably a fabric of woven, knit, or non-woven construction, most preferably woven construction.

A wide variety of natural and synthetic materials may be used as the substrate. By way of example, the following substrates may be employed: polyamides, including nylon, such as nylon 6 and nylon 6,6, and aramids; polyesters, such as polyethylene terephthalate (PET); polyolefins, such as polypropylene and polyethylene; acrylics; polyurethanes; cellulosic materials, such as cotton, rayon, and acetate; and high modulus inorganics such as glass, quartz, and ceramics. Preferably the substrate is selected from polyester, polyamides, or glass, most preferably from polyester fibers.

In the case of textile substrates, virtually any weight fabric may be employed, preferably a fabric weighing 1.5 to 6 $oz/yd^2$, is employed. Knit and woven fabrics may be constructed from staple and continuous filament yarn of virtually any workable denier, preferably from 70 to 210 denier, and continuous filament yarn is also preferred.

In the preferred embodiment of the invention the textile fabric is thoroughly scoured and cleaned such as by methods well known to those skilled in the textile arts so as to remove any particulates, fluids, or other contaminants before the fabric is treated with polymeric inhibitors.

Beginning with a clean, scoured substrate, the first step of the process is the application, to selected areas of the substrate, of a durable inhibitor finish which will inhibit the oxidative polymerization of the monomer into a conductive polymer. As used herein, an "inhibitor finish" is one which, after contacting the substrate with an aqueous mixture of an oxidatively polymerizable monomer and an oxidizing agent under conditions which cause conductive polymer to form on areas unfinished with the inhibitor, will remain substantially intact in the areas to which it is applied and which will continue to inhibit deposition of the conductive polymer throughout the process thereby leaving those areas substantially free of conductive polymer coating.

A number of compounds exhibiting a strong water-repellency may be used in the inhibitor finish. By way of example, the inhibitor finish may comprise silicones, fluorocarbons, paraffins, and polyolefin emulsions. Suitable water-repellant finishes and their application to textiles are commercially available and known to those skilled in the art.

As used herein, silicones refers to film-forming, silicone-containing compounds including pre-polymer and polymers. For example, suitable silicones are disclosed in U.S. Pat. No. 3,631,192 to Michael, U.S. Pat. No. 3,628,907 to Fish, U.S. Pat. No. 4,004,059 to Deiner et al., and U.S. Pat. No. 4,046,930 to Johnson et al. Fluorocarbons refer to fluorine containing hydrocarbons, including pre-polymers and polymers, and in particular refer to compounds containing perfluorocarbon chains or pendant groups. Suitable examples are disclosed in the following U.S. Patents: No. 3,884,879 to Kleiner et al., No. 3,658,857 to Kleiner et al., No. 3,816,167 to Schultz et al., No. 3,597,145 to Marco, No. 4,046,944 to Mueller et al., No. 3,671,493 to Monaco et al., No. 3,598,515 to Moore et al., No. 4,007,305 to Kakar et al., No. 3,912,449 to Mares et al., No. 3,828,087 to Pittman, No. 3,563,999 to Anello et al., No. 3,674,800 to Sweeney et al., No. 3,576,018 to Sweeney et al., and No. 3,683,796 to Scherer et al. Additional silicones and fluorocarbons suitable for use in the present invention are described in "Waterproofing and Water/Oil Repellency," Vol. 24 Kirk-Othmer Encyclopedia of Chemical Technology, 3rd edition, pages 447–452; and in Water and Soil Repellents for Fabrics (Noyes Data Corporation, 1979) written by Charles S. Sodano. Preferably the inhibitor finish comprises a fluorocarbon compound such as FC 251 available from 3M Company located in St. Paul, MN.

The inhibitor finish may be applied by conventional techniques for the application of a pattern to a substrate. For example the inhibitor finish may be applied by printing, by spraying, or by embossed roll. In one embodiment of the invention, a screen printing method is used. In the preferred embodiment of the invention the inhibitor is applied in a controlled spray pattern. This technique is described in Stewart, Jr., U.S. Pat. No. 4,923,743 which is incorporated herein by reference. This has two advantages: (1) the control of the area of application which can be achieved with this technique results in less waste of the inhibitor due to overspraying or overprinting as compared with other techniques such as screen printing and an accompanying reduction in the amount of inhibitor needed; (2) this technique is readily adaptable to the production of large patterns in which the size of the inhibited areas and the spacing between them are varied such that the average conductivity of a given section of the substrate varies continuously in an essentially random fashion throughout the substrate.

Following the application of the inhibitor finish to selected areas of the substrate, the finish may, optionally, be allowed to cure on the substrate. The need for curing the inhibitor will vary with the inhibitor finish employed as will the temperature and time needed to cure it. For example, it may be possible to use a paraffin finish without any curing. However, for a fluorocarbon inhibitor finish a curing time of about 2 minutes at a temperature of about 250° F. is needed as is known to those skilled in the art of applying water-repellant finishes.

Referring to FIG. 1, one embodiment of the present invention is shown, in a partially completed state, having a fabric 1 finished in selected areas 2 with an inhibiting finish.

EXAMPLE 1

Application of an Inhibitor Finish Using a Spray Patterning Apparatus

A mixture consisting of 9 parts water and 1 part FC 251, a fluorocarbon, (available from 3M company, St. Paul, MN) was introduced into a spray patterning device as described in Stewart, Jr., U.S. Pat. No. 4,923,743 containing 5 spray nozzles per inch and having a width of 70 inches.

A 100% polyester Raschel knit fabric weighing 2 ounces per square yard which had been previously scoured was moved through the spray zone while alternately firing the spray nozzles as needed to introduce a pattern of the above mixture on the fabric. The pattern consisted of ovals approximately 2 inches by 1 inch and spaced so that the areas of coverage range from 35% to 15% as shown in FIG. 1.

The finish is made durable by passing the fabric through a 60 foot tenter oven at 300° F. at 30 feet/minute.

EXAMPLE 2

Application of an Inhibitor Finish Using Screen Printing

A print paste consisting of 10 parts FC 251, 86 parts water, and 4 parts of a cellulosic thickener such as Natrasol 250

HHXR (available from Aqualon, Willington, DE) was introduced into a screen printer. The screen was designed so that the paste was printed in ovals 2" by 1". The print density (toning) within each oval was varied from 25% to 100%. The total coverage of the print paste was 20%. After printing, the finish was made durable by heating in an oven at 300° F. for 2 minutes.

Following curing of the inhibitor finish, the substrate is then coated with a conductive polymer in all areas which have not been finished with the inhibitor. Methods for applying this coating are well known in the art and are described in Kuhn, et al., U.S. Pat. No. 4,803,096 and Kuhn, et al., U.S. Pat. No. 4,975,317 both of which are herein incorporated by reference. In general, this involves contacting the substrate material, under agitation conditions, with an aqueous solution of an oxidatively polymerizable monomer, an oxidizing agent, and, optionally, a doping agent or counter ion so that conductive polymer is coated onto the areas of the substrate which have not been finished with the inhibitor. Said contacting being carried out in the presence of a counter ion or doping agent to impart electrical conductivity to said polymer, and under conditions at which the polymerizable compound and the oxidizing agent react with each other to form an in status nascendi forming polymer in said aqueous solution, but without forming a conductive polymer, per se, in said aqueous solution and without either the compound or the oxidizing agent being adsorbed by, or deposited on or in, the textile material; epitaxially depositing onto the surface of the textile material the in status nascendi forming polymer of the polymerizable compound; and allowing the in status nascendi forming compound to polymerize while deposited on the textile material so as to uniformly and coherently cover the textile material with an ordered, conductive film of polymerized compound.

As used herein the phrase "epitaxially deposited" means deposition of a uniform, smooth, coherent and "ordered" film.

The films are either transparent or semi-transparent because the films are, in general, quite thin and one can directly conclude from the intensity of the color observed under the microscope the relative thickness of the film. In this regard, it has been calculated that film thickness may range from about 0.05 to about 2 microns, preferably from 0.1 to about 1 micron.

In general, fabrics treated according to the method of the present invention show resistivities of below $10^6$ ohms per square, such as in the range of from about 50 to 500,000 ohms per square, preferably from about 500 to 5,000 ohms per square.

The starting monomer used may be any oxidatively polymerizable compound which is soluble in aqueous solution. By way of example, the conductive polymer may be selected from polypyrrole, polyaniline, polyacetylene; polythiophthene, poly-p-phenylene, poly(phenylene sulfide), poly(1,6-heptadiyne), polyazulene, poly(phenylene vinylene), and polyphtalocyanines. Preferably the conductive polymer is selected from polypyrrole, polyaniline, and polythipthene. More preferably the conductive polymer is polypyrrole.

As used herein, polypyrrole, polyaniline, polythiophthene, etc. are intended to include polymers made not only from the polymerization of pyrrole, aniline, and thiophene but also polymers made from substituted pyrrole, aniline, and thiophene monomers as is known to those skilled in the art. By way of example, polypyrrole may be synthesized from the following monomers or combinations thereof: pyrrole, 3- and 3,4-alkyl or aryl-substituted pyrrole, N-alkylpyrrole, and N-arylpyrrole. Similarly, by way of example, the following monomers or combinations thereof are suitable for polyaniline synthesis: aniline, 3, and 3,4-chloro, bromo, alkyl, or aryl-substituted aniline.

Figure 2:
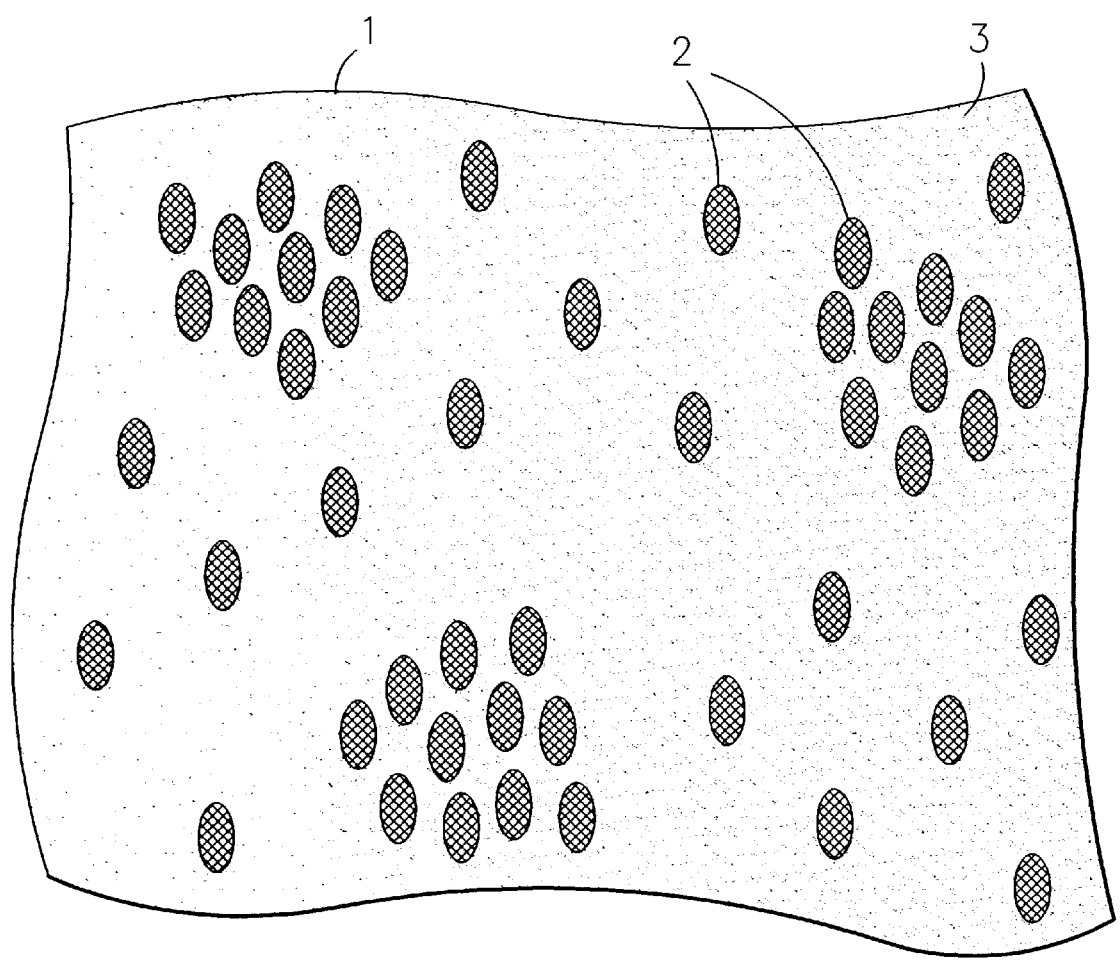
FIG. 2 is a fabric coated with a conductive polymer, except for the areas having an inhibiting finish (ovals).

Referring to FIG. 2, one embodiment of the present invention is shown, in a now completed state, having the fabric 1 coated with a conductive polymer coating 3 in all areas except those selected areas 2 to which an inhibiting finish was previously applied.

Example 3
Coating of the Uninhibited Areas With a Conductive Polymer

A fabric from Example 1 is introduced into a reaction mixture of the following formula:

| | |
|---|---|
| Pyrrole | 30 g per kg of fabric, |
| Ferric Chloride (39% aqueous solution) | 434 g per kg of fabric |
| Anthraquinone-2-sulfonic acid (Na$^+$ salt) | 49 g per kg of fabric |
| Water | 9487 g per kg of fabric |

The fabric was agitated in the mixture for 4 hours, then removed, rinsed with water, and dried. Those areas of the fabric which had previously been finished and cured with the fluorocarbon inhibitor remained free of conductive polymer while those areas which were unfinished were now coated with conductive polypyrrole. Fabric from the above example displayed a surface resistance of approximately 150 ohms/ square in the uninhibited areas and greater than one million ohms per square in the inhibited areas.

The conductivity of the substrates of the present invention can be determined using standard methods. For instance, standard test methods are available in the textile industry and, in particular, AATCC test method 76-1982 is available and has been used for the purpose of measuring the resistivity of textile substrates. According to this method, two parallel electrodes 2 inches long are contacted with the fabric and placed 1 inch apart. Resistivity may then be measured with a standard ohm meter capable of measuring values between 1 ohm and 20 million ohms. Measurements must then be multiplied by 2 in order to obtain resistivity in ohms on a per square basis. While conditioning of the samples may ordinarily be required to specific relative humidity levels, it has been found that conditioning of the samples made according to the present invention is not necessary since conductivity measurements do not vary significantly at different humidity levels. Resistivity measurements are reported herein and in the examples in ohms per square ($\Omega$/sq) and under these conditions the corresponding conductivity is one divided by resistivity.

SUMMARY OF LAB RESULTS

A fabric manufactured as in Example 3 was subjected to measurement of the transmission loss of microwave radiation in the wavelength range of 5–95 gigaHertz (GHz). This frequency range contains the useful range for radar detection. Measurement were made every 2 inches across the width of the fabric. The mean transmission was found to be 30% and the standard deviation of all measurements was 16.37%. These results were found to be effective in defeating certain types of imaging radar including Synthetic Apparature Radar (SAR).

Articles formed according to the present invention find utility in diverse applications. One use is in applications requiring a static-dissipating substrate such as in sanding belts, transport belts, and filtration.

In these applications, substrates made according to the present invention may have from 1 to 99% of the area coated with conductive polymer. Preferably, the conductive polymer is present in a grid or pattern having a continuous network.

Yet another use for which the present invention is particularly suited is in military applications such as camouflage netting. The conductive polymer coated areas of the substrate absorb microwave radiation. The present invention, by allowing conductive areas and nonconductive, inhibited areas of the substrate to be interspaced with great control of both the size and spacing of the areas, can be used to effectively defeat microwave imaging radar.

In one embodiment of the present invention for use in defeating imaging radar, the inhibitor finish is applied by controlled spray patterning to a camouflage netting so that after subsequent coating of the non-inhibitor-finished areas of the netting with polypyrrole, the netting is left with 5 to 95% of the surface coated with conductive polymer, preferably 50 to 90% of the area coated, and most preferably 65 to 85% of the area coated with conductive polymer. The inhibitor is applied in circles or ovals of about 2 inches in diameter. The spacing between these shapes is varied so that the average surface density of the shapes, and therefore the average conductivity of the netting, varies randomly from one area of the netting to the next.

There are, of course, many alternative embodiments and modifications of the present invention, which are intended to be included within the spirit and scope of the following claims.

What we claim is:

1. An article with areas of unequal electrical conductivity comprising:
   (a) a substrate material selected from the group consisting of sheets, films and fabrics;
   (b) a first area on said fabric substrate material having a 0.05 to 2 microns thick, uniform and coherent coating of conductive polymer formed from the oxidative synthesis of said polymer from an aqueous composition, said first area having a resistance of less than $10^6$ ohms per square; and
   (c) a second area on said substrate material which is substantially free of said conductive polymer and which has been finished with a material which inhibits the deposition of said conductive polymer on said second area during oxidative synthesis of said conductive polymer from an aqueous composition.

2. The article of claim 1 wherein said substrate material comprises a fabric material selected from the group consisting of woven, non-woven, and knitted fabric and said coating has a thickness of 0.1 to 1 microns and said first area has a resistance of 50 to 500,000 ohms per square.

3. The article of claim 2 wherein said fabric material is produced from fibers selected from the group consisting of polyester, polyamide, and glass fibers.

4. The article of claim 3 wherein said fibers are polyester.

5. The article of claim 4 wherein said conductive polymer is polypyrrole.

6. The article of claim 4 wherein said inhibiting finish is selected from the group consisting of fluorocarbons and silicones.

7. The article of claim 3 wherein said inhibiting finish is a fluorocarbon.

8. The article of claim 7 wherein said conductive polymer is polypyrrole.

9. The article of claim 1 wherein said substrate material is selected from the group consisting of polyamides, polyesters, polyolefins, acrylics, polyurethanes, glass, quartz and ceramics and said conductive polymer is polypyrrole.

10. The article of claim 1 wherein said inhibiting finish is selected from the group consisting of fluorocarbons and silicones.

11. The article of claim 9 wherein said inhibiting finish is a fluorocarbon.

12. A process for manufacturing an article with areas of unequal electrical conductivity comprising the steps of:
   (a) coating selected areas of a substrate material with a finish which inhibits the deposition of a conductive polymer onto said selected areas during oxidative synthesis of the conductive polymer from an aqueous composition; and
   (b) contacting said substrate material with an aqueous solution having an oxidatively polymerizable monomer, and an oxidizing agent capable of oxidizing said monomer to a polymer, and thereby depositing a 0.05 to 2 microns thick, uniform and coherent coating of said conductive polymer on areas of the substrate material not having the inhibitor finish while leaving the areas having the inhibitor finish substantially free of the conductive polymer, and said areas coated with said conductive polymer have a resistance of less than $10^6$ ohms per square.

13. The process of claim 12 wherein said substrate material is a fabric material produced from fibers selected from the group consisting of polyester, polyamide, and glass fibers and said coating has a thickness of 0.1 to 1 micron.

14. The process of claim 13 wherein said fibers are polyester.

15. The process of claim 14 wherein said conductive polymer is polypyrrole.

16. The process of claim 14 wherein said inhibiting finish is selected from the group consisting of fluorocarbons and silicones.

17. The process of claim 13 wherein said inhibiting finish is a fluorocarbon, and said areas coated with said conductive polymer have a resistance of 50 to 500,000 ohms per square.

18. The process of claim 12 wherein said inhibiting finish is applied by screen printing.

19. The process of claim 12 wherein said inhibiting finish is applied by controlled spray patterning.

20. The process of claim 12 wherein said conductive polymer is polypyrrole, and said area coated with said conductive polymer has a resistance of 500 to 5,000 ohms per square.

21. An article with areas of unequal electrical conductivity comprising:
   (a) a substrate material selected from the group consisting of woven, non-woven and knitted fabric;
   (b) a first area on said substrate material having a coating of polypyrrole formed from the oxidative polymerization of pyrrole from an aqueous composition; and
   (c) a second area on said substrate material which is substantially free of said polypyrrole, and which has been finished with a material selected from the group consisting of fluorocarbons and silicones, which inhibits the deposition of said polypyrrole on said second area, during the oxidative polymerization of said pyrrole from said aqueous composition.

* * * * *